US006339369B1

(12) United States Patent
Paranjpe

(10) Patent No.: US 6,339,369 B1
(45) Date of Patent: Jan. 15, 2002

(54) RETROFITTABLE VEHICLE COLLISION WARNING APPARATUS

(76) Inventor: Ajit P. Paranjpe, 355 N. Wolfe Rd. #336, Sunnyvale, CA (US) 94086

( * ) Notice: Subject to any disclaimer, the term of this patent is extended or adjusted under 35 U.S.C. 154(b) by 0 days.

(21) Appl. No.: 09/159,137

(22) Filed: Sep. 23, 1998

(51) Int. Cl.$^7$ .................................................. B60Q 1/00
(52) U.S. Cl. ...................... 340/436; 340/435; 340/502; 340/903; 340/904
(58) Field of Search ................................ 340/436, 435, 340/502, 903, 904

(56) References Cited

U.S. PATENT DOCUMENTS

| | | | | |
|---|---|---|---|---|
| 4,580,250 A | * | 4/1986 | Kago et al. | 340/904 |
| 4,618,948 A | * | 10/1986 | Sakakibara et al. | 340/904 |
| 4,700,191 A | * | 10/1987 | Manor | 340/502 |
| 5,483,501 A | * | 1/1996 | Park et al. | 340/904 |
| 5,515,341 A | * | 5/1996 | Toda et al. | 340/435 |
| 5,734,336 A | * | 3/1998 | Smithline | 340/903 |
| 5,801,646 A | * | 9/1998 | Pena | 340/904 |
| 5,983,161 A | * | 11/1999 | Lemelson et al. | 340/903 |

* cited by examiner

Primary Examiner—Jeffery Hofsass
Assistant Examiner—John Tweel, Jr.

(57) ABSTRACT

A retrofittable collision warning apparatus for vehicles is described. The collision warning apparatus comprises a base unit that is located within the vehicle cabin and a plurality of remote units located around the periphery of the vehicle. The remote units respond to inputs from the base unit, measure the distance between the vehicle and obstacles in the proximity, and utilize wireless transmission to communicate obstacle position information to the base unit. The base unit accepts operator commands, utilizes wireless communication to transmit control signals to the remote units and receive obstacle position information from the remote units, communicates obstacle position information to the operator through audio and visual signals, and controls operation of the collision warning apparatus. Base unit and remote units that comprise the collision warning apparatus employ power management to extend the lifetime of power sources and communicate through wireless means. These attributes make this collision warning apparatus well suited for quick and easy retrofit to existing vehicles.

16 Claims, 3 Drawing Sheets

RETROFITTABLE VEHICLE COLLISION WARNING APPARATUS

BACKGROUND OF THE INVENTION

1. Field of the Invention

This invention relates in general to vehicular collision avoidance systems and in particular to an easily retrofittable, collision warning apparatus for vehicles that alerts the operator to potential obstacles in the vicinity of the vehicle during operations such as parking and driving in stop and go traffic conditions.

2. Description of Related Art

Traffic statistics show that every 1.6 minutes, a driver backs up into trouble with their car. Children and animals are at risk constantly. Restricted operator visibility in front of the vehicle is a problem for school buses. Young children darting into an obscured area of the bus unseen by the operator have contributed to fatalities. A major cause of vehicle accidents today involves front-to-rear collisions, particularly in stop and go traffic. Insufficient room between vehicles is the primary cause of rear end collisions. Most vehicles have one or more blind spots surrounding the vehicle which cannot be easily observed by the motorist. These blind spots are usually located at the rear corners of the vehicle due to obstructions that block a full view. This is particularly apparent when the vehicle is being reversed, in which case, lack of full view may cause collisions resulting in loss of life and property. In another instance, when a motorist is pulling into or backing out of a parking space, it is difficult for the motorist to maintain attention simultaneously on all sides of the vehicle in order to avoid hitting adjacent objects such as other cars. Not only do such accidents result in loss of life and injuries, but drive up the cost of automobile insurance and repairs. These types of incidents account for the majority of accidents involving vehicles and have spurred the development of collision warning systems.

Parking a vehicle accurately within a garage requires accurate positioning to prevent contact with the front wall and objects placed along the wall, while providing sufficient clearance behind the vehicle. The detection of objects around a vehicle is an ever growing concern, especially with the increased popularity of the larger vehicles such as minivans, trucks, and RVs.

The simplest collision warning systems are passive. They comprise a system of mirrors, markers, and feelers installed around the periphery of the vehicle. These give the operator a visual indication of the extremities of the vehicle so that the operator can estimate the spatial separation between the vehicle and nearby obstacles. Such techniques have limited utility since they rely on the visual acuity and depth perception of the individual, and are ineffective in poor lighting conditions. Luxury car makers have begun to offer active parking aids as standard equipment on their higher end models. An example is the Parktronics system from Mercedes Benz. These systems utilize a plurality of distance measuring sensors mounted around the periphery of the vehicle in the vicinity of the vehicle fenders. The distance measuring sensors are connected to a display and warning system mounted in the vehicle dashboard which provide a continuous indication of potential obstacles in the vehicle's path during operations such as parking. Such is the usefulness and urgency for such a collision warning system that it is expected to be standard equipment on all new cars by the year 2000. Since the typical life-span of the average car in the US is well over a decade, it will be a long time before all the vehicles are equipped with collision warning systems. Thus, there is an urgent need for a collision warning system that is easily retrofittable to existing vehicles for them to remain complaint with evolving safety standards for vehicles.

To address this need, Topix has recently introduced the Mini II car reversing aid that comprises a distance indicator unit mounted within the passenger cabin, and a plurality of distance measuring sensors that are connected to the rear bumper. The distance indicator unit provides a readout of the distance as well as an audio reminder. Similar systems are available in kit form such as the K3502 parking radar from Velleman Kits. For all these systems, the distance measuring sensor has to be electrically connected to the electrical system of the vehicle as well as to an indicator unit mounted within the passenger compartment. Electrical wiring that is preferably concealed has to be installed between the indicator unit and the distance measuring sensors.

Several embodiments of collision warning and avoidance systems have been described in the prior art. Schofield U.S. Pat. No. 5,786,772 describes a passive mirror based system. Sindle U.S. Pat. No. 3,842,397 describes an ultrasonic distance detector for vehicles using a plurality of transducers located around the sides of the vehicle and connected to transmitters for sending sonic pulses to distant objects. Each of the transducers is connected to a receiver for detecting sonic echoes from close objects. The output of each receiver is connected to individual indicator lamps and a warning device such as a horn so that if any of the lamps are energized, the driver is warned that one side of the vehicle is in danger of a collision. The warning is activated if the obstacles are within a pre-determined distance that is set based on the speed of the vehicle.

A variety of distance measuring sensors employing ultrasonic, radio frequency, microwave, optical, and video techniques for distance sensing have been described. These sensors determine the proximity of different sides of a vehicle with respect to external objects. For short distance sensing applications (i.e. sensing distances under 10 feet), ultrasonic sensing is the preferred method. Various embodiments and refinements using ultrasonic sensors for collision warning systems have been described in Sindle U.S. Pat. No. 3,842,397, Sindle U.S. Pat. No. 4,015,232, Duncan U.S. Pat. No. 4,240,152, Vancha U.S. Pat. No. 4,326,273, Kodera U.S. Pat. No. 4,404,541, Kodera U.S. Pat. No. 4,442,512, Tsuda U.S. Pat. No. 4,490,716, Gelhard U.S. Pat. No. 4,500,977, Bruggen U.S. Pat. No. 4,561,064, Tsuji U.S. Pat. No. 4,658,385, Miller U.S. Pat. No. 4,694,295, Riedel U.S. Pat. No. 4,910,512, Forster U.S. Pat. No. 4,980,869, Friberg U.S. Pat. No. 5,208,586, Truesdell U.S. Pat. No. 5,229,975, Qualizza U.S. Pat. No. 5,235,316, Gauthier U.S. Pat. No. 5,303,205, Park U.S. Pat. No. 5,483,501, Waffler U.S. Pat. No. 5,726,647, and Akuzawa U.S. Pat. No. 5,546,086.

Other distance sensing means that have been described include capacitive (Stahovec U.S. Pat. No. 4,300,116), light based (Endo U.S. Pat. No. 4,383,238), radar (Manor U.S. Pat. No. 4,700,191, Pakett U.S. Pat. No. 5,517,196, and Henderson U.S. Pat. No. 5,670,962), doppler radar (Dombrowski U.S. Pat. No. 4,797,673 and Gallagher U.S. Pat. No. 5,453,740), optical imaging (Dye U.S. Pat. No. 4,872,051, Bottesch U.S. Pat. No. 5,166,681, and Truesdell U.S. Pat. No. 5,229,975), electro-optic (Taylor U.S. Pat. No. 5,249,157), infrared (Juds U.S. Pat. No. 5,463,384), laser radar (Shaw U.S. Pat. No. 5,529,138), radiant energy (Cho U.S. Pat. No. 5,646,613), video imaging (Abersfelder U.S. Pat. No. 5,646,614), electromagnetic radiation (Signore U.S. Pat. No. 5,682,136), articulated reflector (Richardson U.S. Pat. No. 5,714,947), and MMIC (Agravante U.S. Pat. No. 5,767,793).

Radar and doppler radar systems are best suited for long range sensing and do not provide sufficient accuracy for objects closer than 10 feet. In addition, they are expensive, lack signal directionality, and need regular maintenance and calibration. Infrared detectors are prone to errors caused by temperature fluctuations. Reflections from nearby objects or reflective surfaces reduce the sensitivity of the infrared sensors. The viewing angle of these systems is limited. Light transmissions are obscured by dust, snow, rain or other environmental factors. To circumvent the limitations of a single sensor technology, multiple sensing techniques may be combined as described by Yoshioka U.S. Pat. No. 5,479,173, Shaffer U.S. Pat. No. 5,612,883, and Nashif U.S. Pat. No. 5,754,123.

Reliability, insensitivity to environmental conditions, and robustness in hostile environments are some of the other key requirements. Ultrasonic sensing is the preferred technique based on these factors. The short range constraint for ultrasonic sensing makes them unsuitable for vehicles traveling over 5–10 miles per hour.

In addition to distance, the warning can also be generated based on speed, direction and the likelihood of the vehicle hitting the obstacles as has been described in Chey U.S. Pat. No. 4,626,850, Shyu U.S. Pat. No. 5,091,726, Shaw U.S. Pat. No. 5,314,037, Katiraie U.S. Pat. No. 5,347,273, Waffler U.S. Pat. No. 5,477,461, Gaus U.S. Pat. No. 5,572,484, Yoshioka U.S. Pat. No. 5,585,798, Arai U.S. Pat. No. 5,680,117, Gilon U.S. Pat. No. 5,684,474, Kikuchi U.S. Pat. No. 5,731,779, Smithline U.S. Pat. No. 5,734,336, Shirai U.S. Pat. No. 5,751,211, Harron U.S. Pat. No. 5,764,136 and Minissale U.S. Pat. No. 5,777,563.

The warning may be communicated by means of a display within the cabin (Lee U.S. Pat. No. 4,943,796, and Blank U.S. Pat. No. 5,708,410), lights on the outside of the vehicle to alert other drivers (Caine U.S. Pat. No. 4,600,913), external speakers to alert other drivers (Sindle U.S. Pat. No. 5,173,881), audible signals emanating from various zones of the car (Takeuichi U.S. Pat. No. 4,528,563), audible tones of varying frequency (Hollowbush U.S. Pat. No. 5,059,946 and Abst U.S. Pat. No. 5,339,075) and inter-vehicle communication (Husher U.S. Pat. No. 5,068,654).

Collision warning systems have evolved to collision avoidance systems in which the trajectory of the vehicle is automatically or manually altered in order to avoid collisions. The warning signals may be used to calculate safe stopping parameters (Emry U.S. Pat. No. 5,436,835) and used to take corrective action such as guiding the driver to take evasive action (Shyu U.S. Pat. No. 4,931,930), assisting the driver during parking (Hoetzel U.S. Pat. No. 5,587,938, Czekaj U.S. Pat. No. 5,742,141), and automatically engaging the vehicles control system to prevent collision (Dombrwski U.S. Pat. No. 4,803,488, David U.S. Pat. No. 4,833,469, Dombrowski U.S. Pat. No. 4,864,298, Reppas U.S. Pat. No. 5,598,164, and Katoh U.S. Pat. No. 5,748,477).

Adams U.S. Pat. No. 5,528,217 describes retrofitting vehicles with collision warning systems using the existing electrical systems. Vehicles pre-wired during manufacture with wiring harnesses used to operate and monitor such vehicle functions as, side and back marker lights, license plate lamps, turn signal and hazard lamps, stop lamps, back-up lights and anti-lock brake devices can be retrofitted. However, since this method involves modification of the original equipment wiring, it may void manufacturer warranty unless performed by an accredited professional. However, none of the prior art describes wireless communication between the indicator unit and the remote sensors that would significantly simplify retrofitting the collision warning system to existing vehicles. Wireless communication with external devices for vehicles is well known. For example keyless car entry, remote garage door openers, and remote car alarms are in widespread use. Schofield U.S. Pat. No. 5,798,688 describes installation of an electromagnetic communication module on a rear view mirror assembly, the communication module being used to communicate with external devices such as keyless entry systems and garage door openers. The requirement for professional or factory installation for prior art systems, involves considerable inconvenience and expense, and is the singular drawback that has slowed their widespread acceptance. The object of the present invention is to obviate the need for electrical wiring between the indicator unit and the distance measuring sensors by utilizing wireless communication between the indicator unit and the remotely mounted sensors. This allows the collision warning apparatus to be installed quickly and easily by the average vehicle operator, without compromising performance and functionality. The principal elements of this invention are the subject of this application.

SUMMARY OF THE INVENTION

The object of the present invention is to provide a retrofittable collision warning apparatus for vehicles that when enabled by the operator, senses the distance between the vehicle and obstacles in the vicinity, and communicates the information to the operator through audio and visual means. A vehicle collision warning apparatus that warns operator of obstacles in the vicinity of the vehicle, in accordance with the present invention, comprises:

(a) base unit located within vehicle cabin that accepts operator commands, controls the operation of the collision warning apparatus, and communicates obstacle position information to operator; and (b) plurality of remote units located around the periphery of vehicle that respond to inputs from base unit, measure the distance between vehicle and obstacles in the proximity, and communicate obstacle position information to base unit through wireless means.

The novel features of the invention are described in the appended claims, but the invention, in both organization and content, will be better understood and appreciated, from the following detailed description provided in conjunction with the drawings.

Most of the figures are for illustrative purposes only, and do not necessarily depict the actual relative sizes or positions of the elements shown.

DETAILED DESCRIPTION OF THE PREFERRED EMBODIMENT

Figure 1:
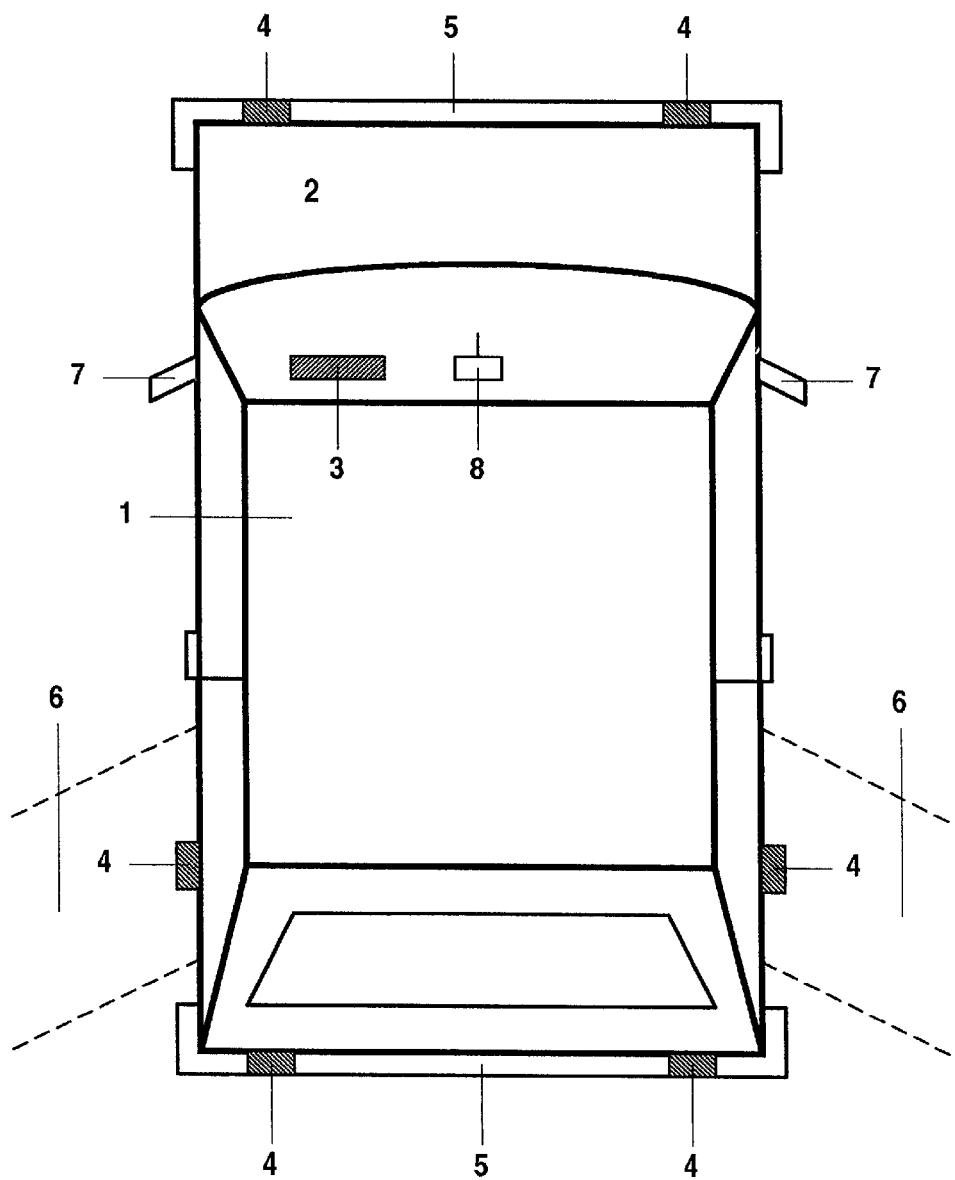
FIG. 1 is a view of the preferred embodiment of the present invention showing the installation of the collision warning apparatus.

The preferred embodiment of the present invention is described with reference to the relevant figures. The preferred embodiment uses standard, off-the-shelf components, for simplicity, although several modifications are possible to reduce size and cost. FIG. 1 shows the vehicle 1 with collision warning apparatus 2. The collision warning apparatus 2 comprises base unit 3 installed within the cabin of vehicle 1, and a plurality of remote units 4 arranged around the periphery of vehicle 1. The operator may choose to install as few as one remote unit depending on the region to be sensed. Base unit 3 may be attached to the vehicle dashboard, rear view mirror or to any other location based on operator preference. Remote units 4 are preferably attached to vehicle 1 in the proximity of fenders 5 using adhesive, two sided tape, or screws. Remote units 4 should be mounted so that they are free of obstructions. FIG. 1 shows a collision warning apparatus 2 consisting of six remote units 4, four of which are mounted on the front and rear fenders 5, and the remaining two are mounted on the left and right hand sides of vehicle 1 within the blind spot region 6. The blind spot region is the portion that is not directly visible to the operator in side-view mirror 7 or rear-view mirror 8. Remote units 4 are preferably contained in a well sealed package to withstand harsh environmental conditions. In the preferred embodiment, which uses ultrasonic distance sensors, the front face of the remote unit (from which distances to obstacles is measured) may have a Fresnel lens that transmits and focuses the exiting and incident ultrasonic radiation.

Figure 2:
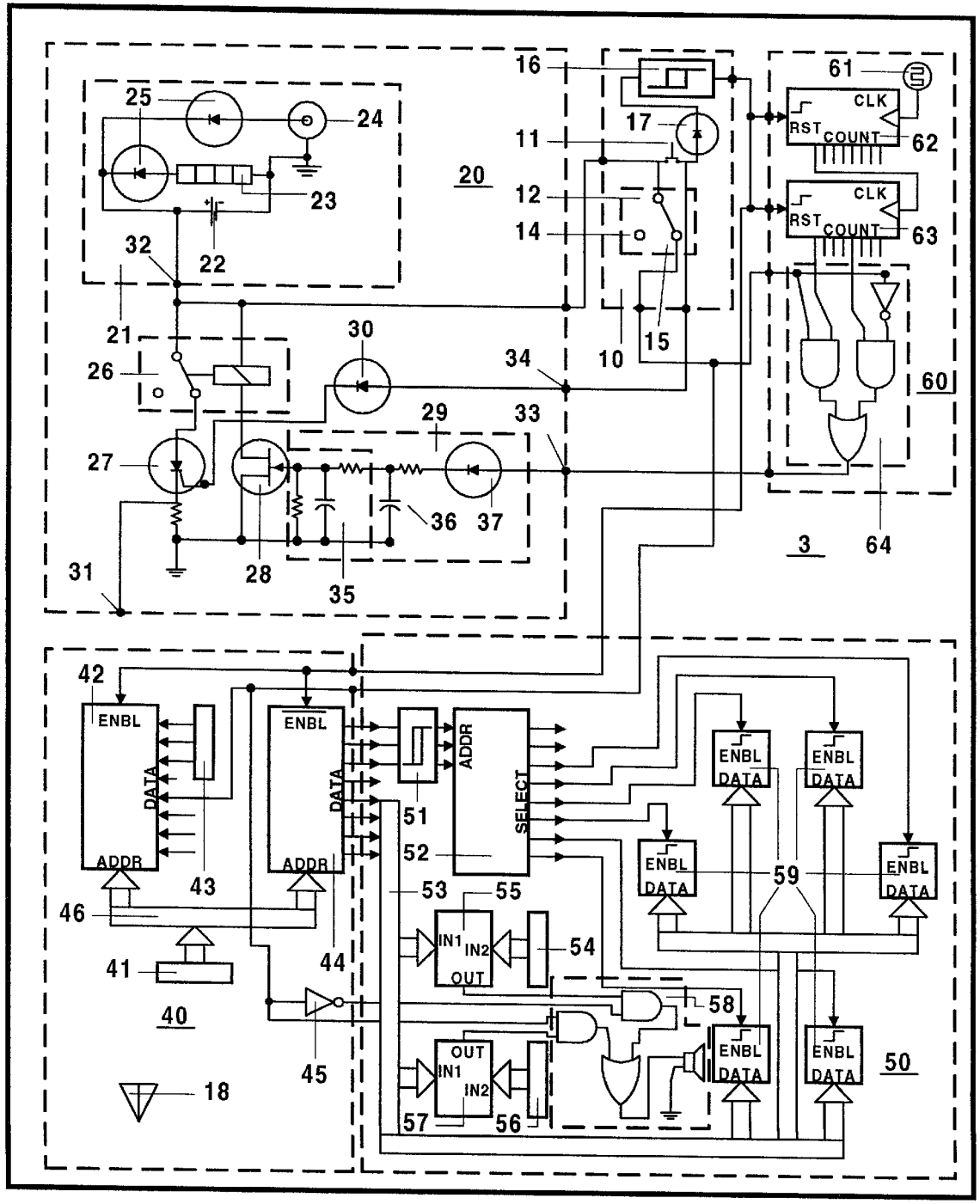
FIG. 2 is a view of the preferred embodiment of the base unit.

FIG. 2 shows the details of base unit 3. It comprises keypad 10 for accepting operator commands, base power module 20 that controls electrical power distribution to base unit 3, base transceiver 40 that communicates with remote units 4, warning indicator module 50 that communicates with operator through audio and visual means, and base control module 60 that controls operation of collision warning apparatus 2.

FIG. 2 shows details of keypad 10, base power module 20, base transceiver 40, warning indicator module 50 and base control module 60. Keypad 10 comprises a momentary-on push button switch 11, a two position switch 12 with position 14 and position 15, pulse delay circuit 16, and signal diode 17. Base power module 20 comprises power source 21, relay 26, silicon controlled rectifier (SCR) 27, N channel field effect transistor (FET) 28, pulse stretcher circuit 29, signal diode 30, switched power output 31, power-off trigger signal 33 and power-on trigger signal 34. Pulse stretcher circuit 29 includes pulse delay circuit 35, input capacitor 36 and signal diode 37. Power source 21 comprises battery 22, solar cell 23, external power jack 24, signal diodes 25, and unswitched power output 32. Solar cell 23 is an optional feature and may be omitted. Signal diodes 25 allow the base unit to operate from a plurality of sources including battery 22, solar cell 23 and external power 24. If a rechargeable battery 22 is used, solar cell 23 charges battery 22. In this manner, the need for external power 24 is obviated. External power 24 could be the cigarette lighter receptacle that is a standard feature in vehicles.

Base transceiver module 40 comprises system identity dip switch 41, encoding transmitter 42, transmitter identity dip switch 43, decoding receiver 44, inverter 45, four bit bus 46, and antenna 18. A number of encoding transmitters 42 and decoding receivers 44 that operate through wireless transmission are commercially available. Wireless transmission can encompass infrared, microwave, RF, and ultrasonic means. The preferred method for this application is RF because it does not rely on line-of-sight transmission and has superior noise immunity. For example, the TX-99/TX-01 miniature, low power, encoding transmitter from Ming Electronics uses 300 MHz RF to serially transmit a string of parallel input data. The corresponding miniature, low power, decoding receiver is RE-99/RE-01 from Ming Electronics that decodes serial transmission received from the encoding transmitter into parallel data. Similar miniature, low power transceivers are available from Velleman Kits (encoding transmitter K6706 and decoding receiver K6707) and other suppliers of remote entry systems. Many of these products feature an on-board antenna 18, although an external antenna 18 may be desirable to improve signal fidelity. The external antenna 18 could be a retractable mini-antenna or a foil strip antenna that is pasted to the surface of the windshield of vehicle 1. Many vehicles already employ a foil strip AM/FM stereo antenna pasted to the surface of the front or rear windshield.

Warning indicator module 50 comprises three bit delay circuit 51, 3 to 8 decoder 52, four bit bus 53, park threshold dip switch 54, four bit comparator 55, drive threshold dip switch 56, four bit comparator 57, buzzer control circuit 58 and plurality of latched displays 59. Base control module 60 comprises clock signal generator 61, eight bit counter 62, eight bit counter 63 and power-off trigger circuit 64. For base unit 3, all circuits are powered using switched power output 31, except for those that are connected directly to unswitched power output 32.

Figure 3:
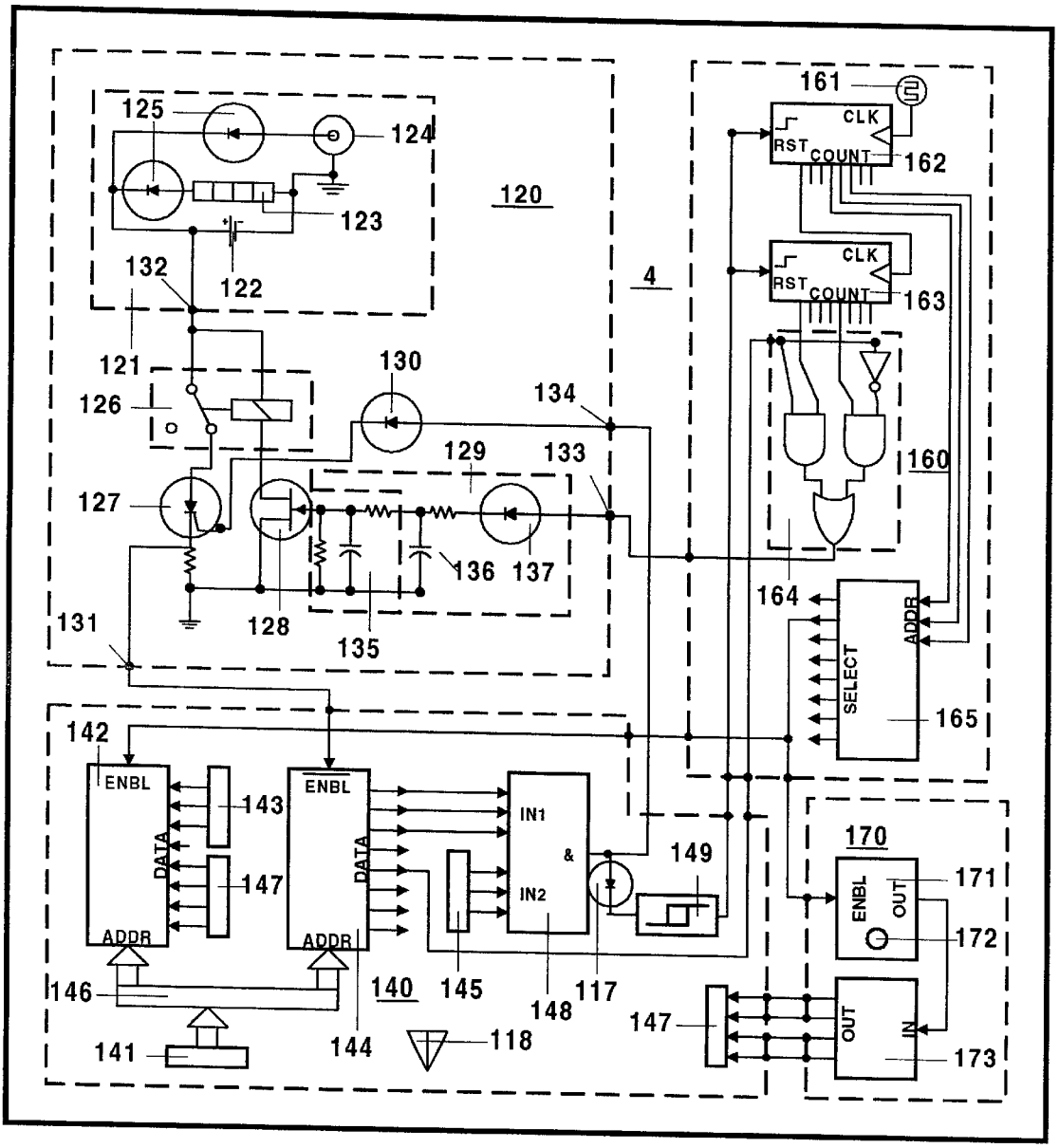
FIG. 3 is a view of the preferred embodiment of the remote unit.

FIG. 3 shows the details of remote unit 4. It comprises remote power module 120 that controls electrical power distribution to remote unit 4, remote transceiver 140 that communicates with base unit 3, remote control module 160 that controls operation of remote unit 4, and distance measuring sensor 170.

FIG. 3 shows details of remote power module 120, remote transceiver 140, remote control module 160 and distance measuring sensor 170. Remote power module 120 comprises power source 121, relay 126, silicon controlled rectifier (SCR) 127, N channel field effect transistor (FET) 128, pulse stretcher circuit 129, signal diode 130, switched power output 131, power-off trigger input 133 and power-on trigger input 134. Pulse stretcher circuit 129 includes pulse delay circuit 135, input capacitor 136 and signal diode 137. Power source 121 comprises battery 122, solar cell 123, external power jack 124, signal diodes 125, and unswitched power output 132. Solar cell 123 is an optional feature and may be omitted. Signal diodes 125 allow the remote unit to operate from a plurality of sources including battery 122, solar cell 123 and external power 124. If a rechargeable battery 122 is used, solar cell 123 charges the battery 122. In this manner, the need for external power 124 is obviated. External power 124 could be electrical connection from the vehicles tail lights or trailer power connector which is standard on most vehicles.

Remote transceiver module 140 comprises system identity dip switch 141, encoding transmitter 142, transmitter identity dip switch 143, decoding receiver 144, base transmitter identity dip switch 145, four bit bus 146, terminal block 147, three channel AND circuit 148, pulse delay circuit 149, signal diode 117 and antenna 118. Encoding transmitter 142 and decoding receiver 144 are similar to encoding transmitter 42 and decoding receiver 44 in base unit 3. Encoding transmitter 142 and decoding receiver 144 may employ an on-board antenna 118, although an external antenna 118 may be desirable to improve signal fidelity. The external antenna 118 could be a retractable mini-antenna or a foil strip antenna that is pasted to the surface of housing for remote unit 4.

Remote control module 160 comprises clock signal generator 161, eight bit counter 162, eight bit counter 163, power-off trigger circuit 164, and 3 to 8 decoder 165. For remote unit 4, all circuits are powered using switched power output 131, except for those that are connected directly to unswitched power output 132. Dip switch 141, decoding receiver 144, dip switch 145, and three channel AND circuit 148 are also connected to unswitched power output 132.

Distance measuring sensor 170 comprises distance sensor 171, full-scale/zeroing control 172 and four bit analog to digital (A/D) converter 173. A number of distance sensors 171 are commercially available. For this application, ultrasonic distance sensing is preferred. For example, the miniature, low power, Sonaswitch Mini-A sensor from EDP measures distances from 6" to 10 feet, and provides an analog signal that is proportional to the distance from the sensor to the obstacle. This analog signal is converted to a digital signal by A/D converter 173.

The operation of collision warning apparatus 2 is now explained with reference to FIGS. 1, 2 and 3. Collision warning apparatus 2 is normally de-energized to conserve power and becomes energized and activated in response to operator input. The operator can set switch 12 to 'Park' mode (position 14) or 'Drive' mode (position 15). The setting of switch 12 sets the time for which collision warning apparatus 2 will be activated. For example, in the 'Park' mode, the activation time may be set to 2 minutes, which is the average time required to park a car. In the 'Drive' mode, the activation time may be set to 30 mins so that collision warning apparatus 2 remains activated while driving in stop and go traffic. In this manner, collision warning apparatus 2 is activated only when required. At the end of the activation period, collision warning apparatus 2 becomes de-energized to conserve power. Having defined the activation time by selecting the position of switch 12, the operator activates the apparatus by momentarily pressing switch 11.

Momentarily pressing switch 11 has several effects. First a power-on trigger signal 34 is generated that turns on SCR 27 which is powered by unswitched power output 32. Signal diode 30 prevents the source voltage that appears at the SCR trigger after SCR 27 has turned on from damaging other circuits. When SCR 27 turns on, power becomes available at switched power output 31. Once power is available at switched power output 31, the other circuits in base unit 3 become energized. Signal diode 17 in conjunction with pulse delay circuit 16 resets counter 62 and counter 63 and enables transmission by encoding transmitter 42. The reset (RST) inputs on counter 62 and 63 are edge-triggered; i.e. they are triggered at the zero to one transition. Pulse delay circuit 16 delays reset signal so that it reaches the RST inputs of counters 62 and 63 a short time after the counters 62 and 63 have been energized. This ensures a proper reset of counters 62 and 63. Clock signal generator 61 delivers a stream of pulses to counter 62 that causes the counter (COUNT) to advance by unity on the zero to one transition of each pulse. Each time the eighth bit on counter 62 transitions to unity, counter 63 advances by unity. Power-off trigger circuit 64 monitors the count on counter 63 and generates power-off trigger signal 33 when the count reaches a preset value that depends on the position of switch 12. Power-off trigger signal 33 is fed to pulse stretcher circuit 29. Signal 33 rapidly charges up the input capacitor 36 in pulse stretcher circuit 29. The charged input capacitor 36 is then fed to pulse delay circuit 35, which turns on N channel FET 28 causing relay 26 to actuate. When relay 26 actuates, SCR 27 turns off, which turns off power at switched power output 31. This turns off all the circuits in the base unit 3 with the exception of circuits that are connected directly to unswitched power 32. Signal diode 37 ensures that input capacitor 36 retains sufficient charge to keep relay 26 actuated for 15–30 s after the power-off trigger signal 33 has been initiated. This prevents spurious powering on of base unit 3 following turn-off.

Encoding transmitter 42 transmits the eight bits present at the data (DATA) input together with the four bits present at the address (ADDR) input in a serial fashion. The four bits at the ADDR input are set by system identity dip switch 41. Each collision warning apparatus 2 will have a unique system identity to prevent cross communication between multiple vehicles employing the same collision warning apparatus 2. The first three bits at the DATA input are defined by transmitter identity dip switch 43, while the fifth bit represents the operating mode (i.e. 0 for 'Park' mode and 1 for 'Drive' mode). The remaining bits are not used. When switch 11 is momentarily pressed, a signal is present at the enable (ENBL) input of encoding transmitter 42. This signal remains on for a short duration after switch 11 is disengaged due to pulse delay circuit 16. While the ENBL signal is on, encoding transmitter 42 continuously transmits the eight bits present at the data (DATA) input together with the four bits present at the address (ADDR) input in a serial fashion through wireless means using antenna 18.

Decoding receiver 44 is enabled only when the encoding transmitter 42 is disabled to avoid false-triggering. Decoding receiver 44 decodes serial input data stream received from remote units 4 through wireless means and antenna 18 into four address bits and eight data bits. When the four address bits received match the system identity present at the ADDR input, the eight data bits are placed on the data (DATA) output of decoding receiver 44. The first three bits of the DATA output identify the remote encoding transmitter 142 while the last four bits represent the distance data transmitted by remote encoding transmitter 142. The first three bits are passed through a three channel pulse delay circuit 51 and then to 3 to 8 decoder 52. The outputs (SELECT) of decoder 52 are connected to the edge-triggered enable (ENBL) inputs of displays 59. For example, if the first three bits are 010, the third bit in the SELECT output will be unity; the rest will be zero. For 111, the eighth bit in the SELECT output will be unity; the rest will be zero. The four data bits are routed to the data (DATA) inputs of displays 59 via four bit bus 53. When the signal at the ENBL input of display 59 transitions from zero to one, the DATA input of display 59 is latched. Display 59 continues to display the DATA input via a 7 segment LED, bargraph LED, or other visual means until the ENBL signal on display 59 transitions from zero to one again. Pulse delay circuit 51 ensures that the data bits are available at DATA inputs of display 59 before the ENBL signal on the selected display 59 is activated.

The four data bits are also fed to four bit comparators 55 and 57. The four data bits are compared with preset values generated by park threshold dip switch 54 and drive threshold dip switch 56. If the four data bits are less than the corresponding preset values, the output (OUT) of the corresponding comparators 55 and 57 get set to unity. Buzzer control circuit 58 analyzes the outputs of comparators 55 and 57 along with the operating mode (defined by position of switch 12), and sounds a buzzer if the four data bits are less than the preset values defined for that operating mode. For example, the preset distances may be 1 foot for the 'Park' mode and 5 feet for the 'Drive' mode. If the operator had chosen the 'Park' mode, the buzzer would sound if any of the remote units 4 reported a distance less than 1 foot. Had the operator chosen the 'Drive' mode, the buzzer would sound if any of the remote units 4 reported a distance less than 5 feet.

Operation of remote unit 4 is analogous to base unit 3 since the majority of circuits are similar. Decoding receiver 144 is enabled only when the switched power output 131 is turned off. Decoding receiver 144 gets disabled when switched power output 131 turns on. Decoding receiver 144 decodes serial input data stream received from base unit 3 through wireless means and antenna 118 into four address bits and eight data bits. When the four address bits received match the system identity present at the ADDR input, the eight data bits are placed on the data (DATA) output of decoding receiver 144. The four bits at the ADDR input are set by system identity dip switch 141. Each collision warning apparatus 2 will have a unique system identity to prevent cross communication between multiple vehicles employing the same collision warning apparatus 2. The first three bits of the DATA output identify the encoding transmitter 42 while the last four bits represent the data bits transmitted by encoding transmitter 42. In the present embodiment, the fifth bit represents the operating mode (i.e. 0 for 'Park' mode and 1 for 'Drive' mode). The remaining bits are not used. The first three bits are matched with preset value in base transmitter identity dip switch 145 using three channel AND circuit 148. When the three data bits match the identity of encoding transmitter 42 (defined by setting of dip switch 43 on base unit 3), a power-on trigger signal 134 is generated that turns on SCR 127 which is powered by unswitched power output 132. Signal diode 130 prevents the source voltage that appears at the SCR trigger after SCR 127 has turned on from damaging other circuits. When SCR 127 turns on, power becomes available at switched power output 131. Once power is available at switched power output 131, the other circuits in remote unit 4 become energized. Signal diode 117 in conjunction with pulse delay circuit 149 resets counter 162 and counter 163. The reset (RST) inputs on counter 162 and 163 are edge-triggered; i.e. they are triggered at the zero to one transition. Pulse delay circuit 149 delays reset signal so that it reaches the RST inputs of counters 162 and 163 a short time after the counters 162 and 163 have been energized. This ensures a proper reset of counters 162 and 163. Clock signal generator 161 delivers a stream of pulses to counter 162 that causes the counter (COUNT) to advance by unity on the zero to one transition of each pulse. Each time the eighth bit on counter 162 transitions to unity, counter 163 advances by unity. Power-off trigger circuit 164 monitors the count on counter 163 and generates power-off trigger signal 133 when the count reaches a preset value. The preset value depends on the value of the fifth data bit received by decoding receiver 144. The value of the fifth bit represents the operating mode (i.e. 0 for 'Park' mode and 1 for 'Drive' mode). The power-off trigger signal 133 is fed to pulse stretcher circuit 129. This signal rapidly charges up the input capacitor 136 in pulse stretcher circuit 129. The charged input capacitor 136 is then fed to pulse delay circuit 135, which turns on N channel FET 128 causing relay 126 to actuate. When relay 126 actuates, SCR 127 turns off, which turns off power at switched power output 131. This turns off all the circuits in the remote unit 4 with the exception of circuits that are connected directly to unswitched power 132. Signal diode 137 ensures that input capacitor 136 retains sufficient charge to keep relay 126 actuated for 15–30 s after the power-off trigger signal 133 has been initiated. This prevents spurious powering on of remote unit 4.

Remote units 4 are energized synchronously in response to momentarily pressing switch 11 on base unit 3. Consequently, counters 162 and 163 in remote units 4 are synchronized (i.e. at any instant all of them display the same count). This can be used to implement time-division multiplexing for synchronous communication between remote units 4 and base unit 3. Synchronous communication is achieved by enabling the remote encoding transmitters 142 one at a time, so that no two transmitters 142 are enabled at the same time. This ensures error-free communication between base unit 3 and remote unit 4. Time-division multiplexed enable signals are generated by feeding three bits from counter 162 into 3 to 8 decoder 165. Each of the output (SELECT) lines represents a time-division multiplexed signal, since at any instant only one of the eight bits on the SELECT output of 3 to 8 decoder 165 is one. Bits two through seven on SELECT output of 3 to 8 decoder 165 can be used as enable signals for up to six remote units 4. FIG. 3 shows bit two being used as the enable signal for the first remote unit 4. In addition to time-division multiplexing for transmitting multiple channels of data, a number of other schemes have been developed and are available. However, time-division multiplexing remains the simplest technique and is used in the preferred embodiment.

When the enable signal is present at the enable (ENBL) input of distance sensor 171, sensor 171 is activated and produces an output that is proportional to the distance between sensor 171 and the nearest obstacle. The zero distance and maximum distance can be adjusted through full-scale/zeroing control 172. The zero and maximum distance can be adjusted during installation to adapt distance sensor 171 to the location of remote unit 4 relative to the extremities of the vehicle 1. The output of sensor 171 is converted to a four bit digital signal by A/D converter 173 and fed to the DATA input of encoding transmitter 142 through jumper block 147. When enable (ENBL) signal on encoding transmitter 142 is on, encoding transmitter 142 continuously transmits the eight bits present at the data (DATA) input together with the four bits present at the address (ADDR) input in a serial fashion through wireless means and antenna 118. The four bits at the ADDR input of encoding transmitter 142 and decoding receiver 144 are set by system identity dip switch 141. Each collision warning apparatus 2 will have a unique system identity to prevent cross communication between multiple vehicles employing the same collision warning apparatus 2. The first three bits of the DATA input are set by transmitter identity dip switch 143 and identify the remote encoding transmitter 142. The last four bits represent the distance data from distance measuring sensor 170.

In this manner, the collision warning apparatus 2 is activated for a preset time based on operator preference, uses remote units 4 to monitor distances to obstacles in the vicinity of the vehicle, and utilizes base unit 3 to display distance information to the operator, and alert the operator in case measured distances are less than preset values. Base unit 3 and remote units 4 that comprise the collision warning apparatus 2 employ power management to extend lifetime of power sources, and communicate through wireless means. These attributes make this collision warning apparatus 2 well suited for quick and easy retrofit to existing vehicles.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A vehicle collision warning apparatus that warns operator of obstacles in the vicinity of the vehicle, comprising:

(a) a base unit means located within a cabin of said vehicle that accepts said operator commands, controls operation of said collision warning apparatus, and communicates said obstacle position information to said operator; and (b) a remote unit means located around the periphery of said vehicle that respond to inputs from said base unit means, measures the distance between said vehicle and said obstacles in the proximity, and communicates said obstacle position information to said base unit means through wireless means, and wherein the remote unit means includes an unswitched power means that supplies power to a receiving means for receiving wireless signals from said base unit means and a switched power means for supplying power to additional modules within said remote unit means based on a wireless transmission from said base unit.

2. A vehicle collision warning apparatus that warns an operator of obstacles in the vicinity of a vehicle, comprising:

a base unit means located within said vehicle cabin comprising:
  (a) a base unit control module means for controlling operation of said base unit means;
  (b) an input module means for accepting commands from said operator;
  (c) a wireless communication module means for communicating with a remote unit means;
  (d) a warning indicator module means for conveying said obstacle position information to said operator; and
  (e) an unswitched power means for supplying power to a first portion of said base unit means; and a remote unit means located on an exterior of said vehicle comprising:
  (a) a remote unit control module means for controlling operation of said remote unit means;
  (b) a distance measuring module means for measuring the distance between said vehicle and said obstacles in the proximity;
  (c) a wireless communication module means for communicating with said base unit means; and
  (d) an unswitched power means for supplying power to a first portion of said remote unit means; and
  (e) a switched power means for selectively supplying power to a second portion of said remote unit means based on wireless communication from said base unit.

3. A vehicle collision warning apparatus in accordance with claim 2, said power management module means comprising:
  (a) battery for powering said collision warning apparatus; and
  (b) electrical circuit means for controlling and selectively supplying power to said remote unit modules based on wireless communication from said base unit.

4. A vehicle collision warning apparatus in accordance with claim 3, said power management module means further comprising:
  (a) solar panel for providing charging power to said battery means.

5. A vehicle collision warning apparatus in accordance with claim 2, said distance measuring module means comprising:
  (a) ultrasonic sensing means for measuring the distance between said vehicle and said obstacles in the proximity.

6. A vehicle collision warning apparatus in accordance with claim 2, said distance measuring module means comprising:
  (a) radar sensing means for measuring the distance between said vehicle and said obstacles in the proximity.

7. A vehicle collision warning apparatus in accordance with claim 2, said wireless communication module means comprising:
  (a) RF communication means for communicating control signals and said obstacle information between said remote unit means and said base unit means.

8. A vehicle collision warning apparatus in accordance with claim 2, said wireless communication module means comprising:
  (a) microwave communication means for communicating control signals and said obstacle information between said remote unit means and said base unit means.

9. A vehicle collision warning apparatus in accordance with claim 2, said wireless communication module means comprising:
  (a) ultrasonic communication means for communicating control signals and said obstacle information between said remote unit means and said base unit means.

10. A vehicle collision warning apparatus in accordance with claim 2, said warning indicator module means comprising:
  (a) visual signal means for displaying said obstacle information to said operator; and
  (b) audio signal means for alerting said operator about said obstacles in close proximity of said vehicle.

11. The vehicle collision warning apparatus of claim 2, wherein said first portion of said base unit means includes said input module means.

12. The vehicle collision warning apparatus of claim 2, wherein said second portion of said base unit means includes said wireless communication module means and said warning indicator module means.

13. The vehicle collision warning apparatus of claim 2, wherein said first portion of said remote unit means includes said a receiving means of said wireless communication module means for receiving wireless transmissions from said base unit means.

14. The vehicle collision warning apparatus of claim 2, wherein said second portion of said remote unit means includes said distance measuring module means and a transmitting means of said wireless communication module means for transmitting information to said base unit.

15. The vehicle collision warning apparatus of claim 2, wherein said unswitched power means of said remote unit continuously supplies power to said first portion.

16. The vehicle collision warning apparatus of claim 1, wherein said unswitched power means continuously supplies power to said receiving means.

* * * * *